United States Patent Office 3,578,654
Patented May 11, 1971

3,578,654
MONOAZO AND DISAZO DISPERSION DYESTUFFS CONTAINING A 2-HYDROXY - 5-β-CYANO-, β-LOWER ALKOXYCARBONYL- OR β-CARBOXAMIDOETHYL BENZENE GROUP
François Favre, Basel, Switzerland, assignor to J. R. Geigy A.G., Basel, Switzerland
No Drawing. Filed Nov. 6, 1967, Ser. No. 680,992
Claims priority, application Switzerland, Nov. 10, 1966, 16,196/66
Int. Cl. C09b 29/00, 29/12, 31/06
U.S. Cl. 260—186
8 Claims

ABSTRACT OF THE DISCLOSURE

Monoazo and disazo dyestuffs are described which are characterized by a novel coupling component of the formula

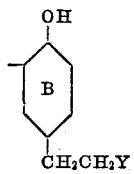

wherein Y represents the cyano group or a functional derivative of the carboxyl group, which does not dissociate acid in water and the benzene ring may contain further substituents; these novel dyestuffs must be free from water-solubilizing groups that dissociate acid in water, and are useful as dispersion dyestuffs for the dyeing of hydrophobic and particularly of polyglycol terephthalate and cellulose ester fibres. Their affinity for polyester fibers, particularly polyglycol terephthalate, is strong and the dyed fibers have good fastness to light and sublimation, their coloration being generally yellow, greenish yellow, orange or yellow-brown.

DESCRIPTION OF THE INVENTION

The present invention concerns new, difficultly water-soluble monoazo and disazo dyestuffs which are useful as dispersion dyestuffs, processes for the production thereof, methods for the dyeing of hydrophobic organic materials particularly fibre materials made from linear high molecular esters of aromatic polycarboxylic acids with polyvalent alcohols, e.g. polyethylene glycol terephthalate fibres, and fibre materials made from cellulose esters, using the new dyestuffs and, as industrial product, hydrophobic organic materials dyed with the new dyestuffs.

It has been found that valuable, difficultly water-soluble monoazo and disazo dyestuffs are obtained by coupling the diazonium compound of an amine of Formula I

A—NH₂  (I)

with a coupling component of Formula II

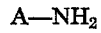
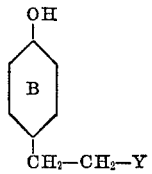

to form an azo dyestuff of Formula III

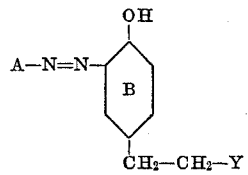

the components of Formulae I and II being so chosen that the azo dyestuff of Formula III contains neither metal-complex forming groupings nor water-solubilising substituents which dissociate acid in water, by which is meant that upon dissociation the dyestuff molecule releases protons or alkali metal or the like cations.

In these formulas:

A represents an aryl radical or the radical of an aromatic heterocycle which radicals can contain as substituents those defined more in detail below, inclusive of arylazo groups, and
Y represents the cyano group or a functional derivative of the carboxyl group, and wherein the benzene ring B can contain further substituents.

The dyestuffs according to the invention must be free from the water solubilizing groups which dissociate acid in water. Such groups are the sulphonic acid, carboxylic acid, phosphenic acid or disulphimide groups.

In dyestuffs in which A is an aryl radical, this radical can be mono- or di-nuclear, condensed or non-condensed. Preferably A is a substituted phenyl radical. Substituents of such radical which are compatible with the use of the dyestuffs of Formula III as dispersion dyestuffs are, chiefly, electron-repelling groups, and among them, mainly, unsubstituted or substituted normal or branched chain lower alkyl groups such as the methyl, ethyl, β-hydroxyethyl, β-hydroxypropyl, cyanoethyl or trifluoromethyl group, or also the cyclohexyl, a phenyl or a phenylalkyl group; also unsubstituted or substituted lower alkoxy groups such as the methoxy, ethoxy, β-hydroxyethoxy, β-methoxyethoxy, methoxycarbonylmethoxy or ethoxycarbonylmethoxy group; unsubstituted or alkyl or halogen substituted phenoxy groups; unsubstituted or substituted aralkoxy groups, such as the benzyloxy, or lower alkylbenzyloxy groups, preferably however, acylamino groups, in particular unsubstituted lower alkanoylamino or alkenoylamino groups, such as the acetylamino, propionylamino, butyrylamino, acryloylamino or methacryloylamino group, or substituted lower alkanoylamino groups, such as the fluoro-, chloro-, bromo-, or trichloro-acetylamino group or the β-chloro- or β-bromo-propionylamino group, also alkoxycarbonylamino groups, such as the methoxycarbonylamino, ethoxycarbonylamino and butoxycarbonyl-amino group and, mainly benzoyl or naphthoyl groups unsubstituted or substituted by halogen such as fluorine, chlorine or bromine, or by lower alkyl, lower alkoxy or lower alkoxycarbonyl groups, also lower alkanesulphonamido groups, such as the methanesulphonamido or ethanesulphonamido group, or benzene-sulphonamido groups, as well as ureido groups of the Formula IV

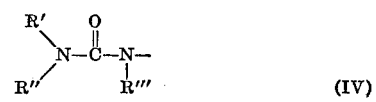

wherein each of R′ and R″ represents hydrogen, lower alkyl, lower hydroxyalkyl, lower alkoxy-lower alkyl, lower alkanoyloxy-lower alkyl or an unsubstituted or substituted phenyl, cyclohexyl, lower alkylphenyl, benzyl group and R‴ represents hydrogen or lower alkyl.

A in the meaning of a phenyl radical can also be substituted, alone or, preferably, in combination with the above-mentioned substituents, by other substituents compatible with the aforesaid use of the dyestuffs of Formula III, e.g. by halogens, such as fluorine, chlorine and bromine, the cyano or nitro group; acyl groups, such as lower alkanoyl and benzoyl groups; lower alkylsulphonyl or phenylsulphonyl groups, as well as phenoxysulphonyl, lower alkylphenoxysulphonyl or halogenophenoxysulphonyl, carboxy ester groups, such as the phenoxycarbonyl, lower alkylphenoxycarbonyl or halogenophenoxycarbonyl group, particularly however, lower alkoxycarbonyl groups, such as the methoxycarbonyl, ethoxycarbonyl, isopropoxycarbonyl or butoxycarbonyl group; or by a grouping of the Formula V

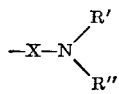

wherein X represents —SO$_2$— or —CO— and R' and R'' have the meanings given in Formula IV.

Disazo dyestuffs falling under Formula III are those in which A represents a phenyl group, substituted by an arylazo group, the latter being preferably a phenylazo group, the phenyl nucleus of which is unsubstituted or can be substituted by halogens, e.g. fluorine, chlorine or bromine, lower alkyl, lower alkoxy, lower hydroxyalkoxy, lower alkylsulphonyl, nitro or hydroxyl. More preferably, A represents a phenyl radical unsubstituted or substituted by lower alkyl and/or lower alkoxy groups, and which radical contains the above described arylazo group in 3- or preferably, 4-position to the azo bridge shown in Formula III. In particular A represents a 4-phenylazophenyl group.

In dyestuffs, in which A is a naphthyl radical, the latter is either an unsubstituted or substituted 1- or 2-naphthyl radical. The substituents of this naphthyl radical are selected from lower alkyl and lower alkoxy groups, or halogen, such as fluorine, chlorine or bromine, acylamino groups, preferably benzoylamino groups, sulphamoyl and carbamoyl groups, as defined in Formula V, phenoxysulphonyl groups, lower alkylsulphonyl groups and phenylsulphonyl groups.

In dyestuffs in which A is the radical of an aromatic heterocycle, the latter is in particular an unsubstituted or substituted 5- or 6-membered heterocycle, especially a heterocycle containing nitrogen, e.g. a radical of the pyrazole, thiazole, oxadiazole, thiadiazole, 1,2,4-triazole or pyridine series. A can also represent a polynuclear condensed heterocycle which preferably contains a benzene ring fused to the heterocyclic ring, e.g. unsubstituted or substituted benzothiazole, benzotriazole, indazole or quinoline radicals. The fused benzene rings can contain substituents compatible with the use of the novel dyestuffs as dispersion dyestuffs, particularly halogen, nitro, lower alkyl, lower alkoxy, lower alkylsulphonyl, lower alkanoylamino groups and/or sulphamoyl groups optionally N-substituted as described above but preferably by lower alkyl. Substitutents at heterocyclic rings mentioned above, especially when the latter are not fused, are preferably selected from, in the case of pyrazol, lower alkyl, unsubstituted phenyl or phenyl substituted as described hereinbefore in 1-position and lower alkyl, lower alkoxycarbonyl or a grouping of Formula V. in which X has the meaning of —CO— in 3-position, in the case of thiazole, lower alkyl, phenyl and/or nitro, in the case of the remaining heterocycles, when unfused lower alkyl, and in the case of the heterocyclic ring of quinoline, lower alkyl and halogen.

In dyestuffs according to the invention, in which Y represents a functional derivative of the carboxyl group, it is preferably a lower alkoxycarbonyl group, such as the methoxycarbonyl, ethoxycarbonyl, isopropoxycarbonyl or butoxycarbonyl group, or a grouping of the formula —CONR'R'', in which R' and R'' have the meanings given in Formula IV.

Preferably, however, Y represents the cyano group.

As further substituents, the benzene ring B can obtain any other substituents compatible with the use of the dyestuffs of Formula III as dispersion dyestuffs, namely, halogen, such as chlorine and/or bromine, lower alkoxy groups, such as the methoxy or ethoxy group, and particularly, however, lower alkyl groups such as the methyl, ethyl or tert.butyl group. Preferably the benzene ring B is not further substituted.

In the preferred dyestuffs according to the invention, which are distinguished by very good fastness to sublimation and light as well as very good drawing power and build up on hydrophobic fibres, A in Formula III represents a phenyl radical substituted in p-position to the azo group by an acylamino group, in particular a p-benzoylaminophenyl group optionally substituted at the benzoyl moiety by halogen, such as chlorine or bromine, lower alkyl and/or lower alkoxy groups, whereas Y represents the cyano group and the benzene ring B is not further substituted.

"Lower" when preceding an aliphatic radical means that such radical has at most 4 carbon atoms. "Halogen" means a halogen atom of an atomic number of at most 35 and preferably chlorine and bromine.

Diazo components, which can be used according to the invention and fall under Formula I are known or can be produced by known methods.

Coupling components of Formula II usable according to the invention are obtained, e.g. by reacting 1-hydroxybenzene compounds unsubstituted in p-position with acrylonitrile in the presence of suitable catalysts such as aluminium chloride.

If desired, the p-cyanoethyl phenols so obtained can be converted into functional derivatives of the carboxyl group, e.g. by saponification of the cyano group with 80% sulphuric acid to form the corresponding carboxylic acids and esterification of the carboxylic acids with alcohols to form the corresponding carboxylic acid esters, and, optionally, subsequent reaction of these esters with ammonia, primary or secondary amines to form the corresponding carboxylc acid amides.

Examples of coupling components are: 1-hydroxy-4-β-cyanoethylbenzene; 1-hydroxy-2-chloro-, -2-bromo-, -2-methyl-, -2-tert.butyl- or -2-methoxy-4-β-cyanoethylbenzene; γ-[1-hydroxyphenyl-(4)]-propionic acid methyl, propyl or isobutyl ester, γ-[1-hydroxy-2-tert.butyl-phenyl-(4)]-propionic acid methyl ester, γ-[1-hydroxy-2-chloro-, -2-methyl- and -2-tert.butyl-phenyl-(4)]-propionic acid ethyl ester; γ-[1-hydroxy-phenyl-(4)]-propionic acid amide as well as -propionic acid-N-phenyl-, -N-(4'-chlorophenyl)-, -N-(3'-methylphenyl)-, -N-benzyl-, -N-cyclohexyl-, -N,N-dimethyl-, -N-methyl-N-phenyl-, -N-methyl-N-acetoxyethyl and -N-ethyl-N-β-hydroxyethylamide or -β-ethoxyethylamide.

The diazonium compound of an amine of Formula I is coupled with the coupling component of Formula II by the usual processes, preferably in an alkaline aqueous medium. The resulting dyestuffs which are very slightly difficultly soluble in water are isolated, e.g. by filtration.

It is of advantage to bring the dyestuffs according to the invention into a finely distributed form by milling with surface active dispersing agents. Anionic dispersing agents, e.g. alkylaryl sulphonates, alkali metal salts of the condensation products of formaldehyde and naphthalene sulphonic acids, lignin sulphonates, or non-ionogenic dispersings agents such as fatty alcohol polyglycol ethers or higher alkylphenyl polyglycol ethers are suitable for this purpose. The dyestuffs according to the invention are milled with such dispersing agents preferably with the addition of water in the presence of pulverising elements such as glass beads. The resultant aqueous dyestuff pastes which contain the dyestuffs in a finely distributed form, can be used either direct for dyeing or prepared by the usual methods into non-dusty powders by careful drying.

Prepared in such ways, the dyestuffs according to the invention are suitable, chiefly, for the dyeing of hydrophobic organic material, particularly for the dyeing of fibre material from aqueous dispersion, e.g. for the dyeing of cellulose acetate fibres such as cellulose-2½-acetate and cellulose-triacetate fibres, particularly however, for the dyeing of textile fibres made from linear high molecular esters of aromatic polycarboxylic acids with polyfunctional alcohols, e.g. of polyglycol terephthalate, polygylcol isophthalate or poly-(1,4-cyclohexane dimethylol terephthalate) fibres.

The dyestuffs according to the invention, however, can also be used for the dyeing of synthetic polyamide fibres such as nylon.

Polyglycol terephthalate fibres are dyed with aqueous dispersions of the dyestuffs according to the invention preferably at temperatures of above 100° C. under pressure. The dyeing however, can also be performed at the boiling point of the dye liquor in the presence of so-called carriers, e.g. alkali phenyl phenolates such as sodium-o-phenyl phenolate, polychlorobenzene compounds or similar auxiliaries. Such fibres can also be dyed by the pad dyeing method followed by thermofixation at 180–220° C.

The dyestuffs according to the invention have good affinity to hydrophobic organic fibres, particularly to polyglycol terephthalate and cellulose triacetate fibres, and on these fibres they produce level, strongly coloured, greenish yellow, yellow and orange dyeings which have good fastness to washing, milling, sublimation, light, rubbing, perspiration, solvents, cross dyeing, decatising, gas fading and industrial fumes.

In addition, animal and vegetable fibres, particularly cotton or wool, are very well preserved by the dyestuffs according to the invention. Good and evenly penetrated dyeings are obtained with the dyestuffs according to the invention on closely woven fabric or tightly twisted yarns, e.g. in core or cheese form.

Compared with known dyestuffs of similar constitution, containing a lower alkyl group instead of the substituent —$CH_2$—$CH_2$—Y the dyestuffs of Formula III according to the invention are primarily distinguished by improved fastness to sublimation. Experience has shown that improvement of the fastness to sublimation is generally accompanied by loss of drawing power and build up. Surprisingly however, in spite of strongly increased fastness to sublimation, the drawing power and build up of the dyestuffs according to the invention is retained, or in some cases, it is even improved. Because of the extraordinarily good fastness to sublimation and great affinity to polyglycol terephthalate fibres, the new dyestuffs are very well suited for the so-called thermosol dye process. Also when applied in this way, the dyestuffs produce level greenish yellow, yellow and orange dyeings which are fast to rubbing. The variations of fixing temperature usual in practice have only a slight influence on the shade and depth of shade of the dyeings. In addition, in many cases dyeings produced with dyestuffs according to the invention have better fastness to light.

The dyestuffs according to the invention are also suitable for the dyeing of cellulose acetates, polyglycol terephthalates and polyamides in the mass. Because of their good solubility in organic solvents such as acetone or chloroform, they can also be used in lakes and printing inks.

The following non-limitative examples illustrate the invention further. The temperatures are given therein in degrees centigrade. Commercially available "polyglycol terephthalates" are, e.g. such well known products as Terylene, Vycron, Dacron and Trevira. Percentages are given by weight.

EXAMPLE 1

21.2 g. of 1-amino-4-benzoylaminobenzene are finely dispersed in a mixture of 550 ml. of water and 35 ml. of concentrated (36.5%) hydrochloric acid, and diazotized, at 0–5° by pouring in a solution of 6.9 g. of sodium nitrite in 70 ml. of water. The diazonium salt solution obtained is added dropwise at 0–5° to a solution of 14.7 g. of 1-hydroxy-4-β-cyanoethyl-benzene in 450 ml. of water and 20 ml. of 30% aqueous sodium hydroxide solution. On completion of the coupling, the yellow precipitate formed is filtered off, washed neutral with water and dried in vacuo at 70–75°. The dyestuff is a yellow powder and corresponds to the formula

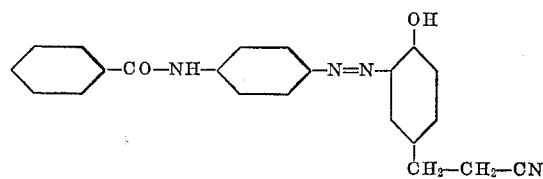

After milling with the sodium salt of a condensation product of naphthalene-2-sulphonic acid and formaldehyde, the dyestuff obtained dyes polyglycol terephthalate fibres such as "Dacron" in pure yellow shades from an aqueous dispersion, optionally in the presence of a carrier such as the sodium salt of o-phenylphenol. The dyebath is substantially exhausted. The dyeings have very good fastness to washing, sublimation and light.

If in the above example, instead of the 21.2 g. of 1-amino-4-benzoylamino-benzene, the equimolar amount of the diazo components given in the following Table I, column 2, is used and this is coupled under the conditions given in the above example, then dyestuffs are obtained which produce deyings on polyglycol terephthalate fibres which have similar good properties. The shades thereof are given in column 3.

TABLE I

| No. | Diazo component | Shade on polyglycol-terephthalate fibres |
|---|---|---|
| 2 | 1-amino-4-(4'-chlorobenzoylamino)-benzene | Yellow. |
| 3 | 1-amino-4-(2',5'-dichlorobenzoylamino)-benzene | Do. |
| 4 | 1-amino-4-(4'-methylbenzoylamino)-benzene | Do. |
| 5 | 1-amino-3-benzoylaminobenzene | Do. |
| 6 | 1-amino-3-chloro-4-benzoylaminobenzene | Do. |
| 7 | 1-amino-4-phenyl-sulfonylaminobenzene | Do. |
| 8 | 1-amino-4-[N-(4'-methylphenyl)-sulphamoyl]benzene. | Do. |
| 9 | 1-amino-3-methoxy-4-benzoylaminobenzene | Do. |
| 10 | 1-amino-4-benzoylaminonaphthalene | Do. |
| 11 | 1-amino-4-cyclohexylbenzene | Do. |
| 12 | 1-amino-4-phenylbenzene | Do. |
| 13 | 1-amino-4-benzylbenzene | Do. |
| 14 | 1-amino-4-β-hydroxyethoxybenzene | Do. |
| 15 | 1-amino-4-(methoxyethoxy)-benzene | Do. |
| 16 | 1-amino-4-ethylbenzene | Do. |
| 17 | 1-amino-4-isopropylbenzene | Do. |
| 18 | 1-amino-4-(β-cyanoethyl)-benzene | Do. |
| 19 | 1-amino-4-benzyloxybenzene | Do. |
| 20 | 1-amino-4-(4'-methylbenzyloxy)-benzene | Do. |
| 21 | 1-amino-4-acryloylaminobenzene | Do. |
| 22 | 1-amino-4-methacryloylaminobenzene | Do. |
| 23 | 1-amino-4-(bromoacetylamino)-benzene | Do. |
| 24 | 1-amino-4-(fluoroacetylamino)-benzene | Do. |
| 25 | 1-amino-4-(β-chloropropionylamino)-benzene | Do. |
| 26 | 1-amino-2-chloro-4-benzolaminobenzene | Do. |
| 27 | 1-amino-4-(4'-methoxybenzoylamino)-benzene | Do. |
| 28 | 1-amino-4-methoxycarbonylbenzene | Do. |
| 29 | 1-amino-4-methylsulphonylaminobenzene | Do. |
| 30 | 1-amino-4-ethylsulphonylaminobenzene | Do. |
| 31 | 1-amino-4-(4'-methylphenylsulphonylamino)-benzene. | Do. |

EXAMPLE 32

15 g. of 1-amino-4-acetylamino-benzene are finely dispersed in a mixture of 320 ml. of water and 35 ml. of concentrated (36.5%) hydrochloric acid, and diazotised by the dropwise addition of a solution of 6.9 g. of sodium nitrite in 110 ml. of water, at a temperature of 0–3°. At 0–5°, the diazonium salt solution is added dropwise to a solution of 14.7 g. of 1-hydroxy-3-β-cyanoethyl-benzene in 400 ml. of water and 20 ml. of 30% aqueous sodium hydroxide solution. On completion of the coupling, the precipitated yellow precipitate is filtered off, washed neutral with water and dried in vacuo at 70–75° The dyestuff is a yellow powder and corresponds to the formula

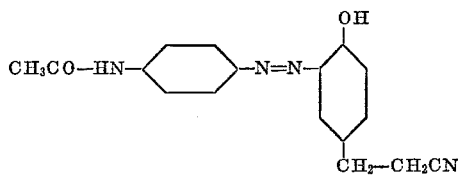

When milled with the sodium salt of a condensation product of naphthalene-2-sulphonic acid and formaldehyde, the preparation dyes polyglycol terephthalate, such as "Terylene" in pure yellow shades from an aqueous dispersion, optionally in the presence of carriers such as the sodium salt of o-phenylphenol. The dyeings have very good fastness to washing, sublimation and light.

If in the above example, the 15 g. of 1-amino-4-acetylaminobenzene are replaced by the corresponding amount of one of the diazo components given in column 2 of the following Table II and this is coupled under the conditions described in the above example with one of the coupling components given in column 3, then dyestuffs are obtained which produce dyeings having similar good properties on polyglycol terephthalate fibres. The shades thereof are given in the last column of Table II.

TABLE II

| No. | Diazo component | Coupling component | Shade on polyglycol terephthalate fibres |
|---|---|---|---|
| 33 | 1-amino-4-propionylaminobenzene. | 1-hydroxy-4-β-cyanoethylbenzene. | Yellow. |
| 34 | 1-amino-4-butyrylaminobenzene. | do | Do. |
| 35 | 1-amino-4-chloroacetylaminobenzene. | 1-hydroxy-2-methyl-4-β-cyanoethylbenzene. | Do. |
| 36 | 1-amino-4-trichloroacetylaminobenzene. | do | Do. |
| 37 | N-benzyl-N'-(4-aminophenyl)-urea. | do | Do. |
| 38 | N-methyl-N'-(4-aminophenyl)-urea. | do | Do. |
| 39 | N,N-dimethyl-N'-(4-aminophenyl)-urea. | γ-[1-hydroxy-2-methylphenyl-(4)]-propionic acid ethyl ester. | Do. |
| 40 | N-ethyl-N-β-hydroxyethyl-N'-(4-aminophenyl)-urea. | do | Do. |
| 41 | N-γ-methoxypropyl-N'-(4-aminophenyl)-urea. | do | Do. |
| 42 | N-phenyl-N'-(4-aminophenyl)-urea. | do | Do. |
| 43 | N-methyl-N-phenyl-N'-(4-aminophenyl)-urea. | γ-[1-hydroxy-2-chlorophenyl-(4)]-propionic acid ethyl ester. | Do. |
| 44 | N-phenyl-N'-methyl-N'-(4-aminophenyl)-urea. | do | Do. |
| 45 | N-methyl-N-(4''-methylphenyl)-N'-(4-aminophenyl)-urea. | do | Do. |
| 46 | N-cyclohexyl-N'-(4-aminophenyl)-urea. | do | Do. |
| 47 | 1-amino-4-(N-methylsulphamoyl)-benzene. | do | Do. |
| 48 | 1-amino-4-(N-phenylsulphamoyl)-benzene. | do | Do. |
| 49 | Aniline | 1-hydroxy-2-chloro-4-β-cyanoethylbenzene. | Do. |
| 50 | 1-amino-4-methylbenzene. | do | Do. |
| 51 | 1-amino-4-methoxybenzene. | do | Do. |
| 52 | 1-amino-4-ethoxybenzene. | do | Do. |
| 53 | 1-amino-4-(β-hydroxyethyl)-benzene. | do | Do. |
| 54 | 4-aminophenoxy-acetic acid methyl ester. | 1-hydroxy-2-methoxy-4-β-cyanoethylbenzene. | Do. |
| 55 | 1-amino-4-phenoxybenzene. | do | Do. |
| 56 | 1-amino-4-(4'-chlorophenoxy)-benzene. | do | Do. |
| 57 | 1-amino-4-(2'-methylphenoxy)-benzene. | do | Do. |
| 58 | 2-amino-5-(N-methylsulphamoyl)-naphthalene. | 1-hydroxy-4-β-cyanoethylbenzene. | Do. |
| 59 | 1-amino-3-methoxy-4-acetylaminobenzene. | do | Do. |
| 60 | 1-amino-4-bromobenzene. | do | Do. |
| 61 | 1-amino-2,4-dibromobenzene. | do | Do. |
| 62 | 1-amino-4-fluorobenzene. | do | Do. |
| 63 | 1-amino-4-cyanobenzene. | do | Do. |
| 64 | 1-amino-3-chloro-4-benzoylaminobenzene. | do | Do. |

EXAMPLE 65

A suspension of 13.8 g. of 1-amino-4-nitrobenzene in 150 ml. of water and 30 ml. of concentrated (36%) hydrochloric acid is diazotised in the usual way at 0–5° by the addition of a solution of 6.9 g. of sodium nitrite in 50 ml. of water. The diazonium salt solution is poured into a solution of 14.7 g. of 1-hydroxy-4-β-cyanoethylbenzene in 450 ml. of water and 20 ml. of 30% aqueous sodium hydroxide solution while stirring at 5–10°. On completion of the coupling, the precipitated yellow-orange precipitate, the composition of which corresponds to the formula

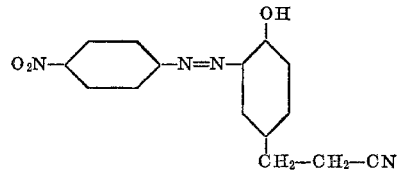

is filtered off, washed neutral with a large amount of water and dried in vacuo at 60–70°.

After milling with the sodium salt of a lignin sulphonate, the dyestuff so obtained dyes polyglycol terephthalate fibres in yellow-orange shades from an aqueous dispersion, optically in the presence of a carrier such as trichlorobenzene. The dyebath is substantially exhausted. The dyeings have good fastness to washing and sublimation.

Dyestuffs having similar properties are obtained if, instead of the 13.8 g. of 1-amino-4-nitrobenzene, the equimolar amount of one of the diazo components given in column 1 of the following Table III is coupled under the conditions given in this example with the equimolar amount of one of the coupling components given in column 3. The shades of the dyeing on polyglycol terephthalate fibres obtained with these dyestuffs are given in column 4.

TABLE III

| No. | Diazo component | Coupling component | Shade on polyglycol terephthalate fibres |
|---|---|---|---|
| 66 | 1-amino-3-nitrobenzene | 1-hydroxy-2-tert.butyl-4-β-cyanoethylbenzene. | Yellow-orange. |
| 67 | 1-amino-2-nitrobenzene | do | Do. |
| 68 | 1-amino-4-trifluoromethylbenzene. | do | Do. |
| 69 | 1-amino-4-acetylbenzene. | do | Do. |
| 70 | 1-amino-4-benzoylbenzene. | do | Do. |
| 71 | 1-amino-4-methylsulphonylbenzene. | do | Do. |
| 72 | 1-amino-4-phenylsulphonylbenzene. | do | Do. |
| 73 | 1-amino-4-phenoxysulphonylbenzene. | 1-hydroxy-4-β-cyanoethylbenzene. | Do. |
| 74 | 1-amino-4-methoxycarbonylbenzene. | do | Do. |
| 75 | 1-amino-4-ethoxycarbonylbenzene. | γ-[1-hydroxy-2-tert.-butylphenyl-(4)]-propionic acid methyl ester. | Do. |
| 76 | 1-amino-4-phenoxycarbonylbenzene. | do | Do. |

TABLE III

| No. | Diazo component | Coupling component | Shade on polyglycol terephthalate fibres |
|---|---|---|---|
| 77 | 1-amino-4-dimethyl-sulphamoylbenzene. | ....do.... | Do. |
| 78 | 1-amino-4-methyl-sulphamoylbenzene. | γ-[1-hydroxy-2-tert.-butylphenyl-(4)]-propionic acid ethyl ester. | Do. |
| 79 | 1-amino-4-diethyl-sulphamoylbenzene. | ....do.... | Yellow. |
| 80 | 1-amino-4-(N-ethyl-N-β-hydroxyethyl)-sulphamoyl-benzene. | ....do.... | Do. |
| 81 | 1-amino-4-(γ-methoxypropyl-sulphamoyl)-benzene. | ....do.... | Do. |
| 82 | 1-amino-4-phenyl-sulphamoylbenzene. | 1-hydroxy-4-β-cyanoethylbenzene. | Do. |
| 83 | 1-amino-4-(N-methyl-N-phenylsulphamoyl)-benzene. | ....do.... | Do. |
| 84 | 1-amino-4-cyclohexyl-sulphamoylbenzene. | ....do.... | Do. |
| 85 | 1-amino-4-methyl-carbamoylbenzene. | ....do.... | Do. |
| 86 | 1-amino-4-dimethyl-carbamoylbenzene. | 1-hydroxy-2-bromo-4-β-cyanoethylbenzene. | Do. |
| 87 | 1-amino-4-diethyl-carbamoylbenzene. | ....do.... | Do. |
| 88 | 1-amino-4-(N-ethyl-N-β-hydroxyethyl-carbamoyl)-benzene. | ....do.... | Do. |
| 89 | 1-amino-4-(γ-methoxy-propylcarbamoyl)-benzene. | ....do.... | Do. |
| 90 | 1-amino-4-n-butyl-carbamoylbenzene. | 1-hydroxy-2-chloro-4-β-cyanoethylbenzene. | Do. |
| 91 | 1-amino-4-phenyl-carbamoylbenzene. | ....do.... | Do. |
| 92 | 1-amino-4-(N-methyl-N-phenyl-carbamoyl)-benzene. | ....do.... | Do. |
| 93 | 1-amino-4-cyclohexyl-carbamoylbenzene. | ....do.... | Do. |
| 94 | 1-amino-4-benzoyl-aminobenzene. | γ-[1-hydroxyphenyl-(4)]-propionic acid N-(4'-chlorophenyl)-amide. | Do. |
| 95 | ....do.... | γ-[1-hydroxyphenyl-(4)]-propionic acid N-(3'-methylphenyl)-amide. | Do. |
| 96 | ....do.... | γ-[1-hydroxyphenyl-(4)]-propionic acid N-benzylamide. | Do. |
| 97 | ....do.... | γ-[1-hydroxyphenyl-(4)]-propionic acid N-cyclohexylamide. | Do. |
| 98 | ....do.... | γ-[1-hydroxyphenyl-(4)]-propionic acid N-ethyl-N-β-ethoxy-ethylamidel | Do. |
| 99 | ....do.... | γ-[1-hydroxyphenyl-(4)]-propionic acid propyl ester. | Do. |
| 100 | ....do.... | γ-[1-hydroxyphenyl-(4)]-propionic acid isobutyl ester. | Do. |
| 101 | ....do.... | γ-[1-hydroxyphenyl-(4)]-propionic acid N-methyl-N-acetoxyethylamide. | Do. |
| 102 | 1-amino-4-butyl-sulphonylbenzene. | 1-hydroxy-4-β-cyanoethylbenzene. | Do. |
| 103 | 1-amino-4-(4'-chlorophenoxy-sulphonyl)-benzene. | ....do.... | Do. |
| 104 | 1-amino-3-butoxy-sulphonylbenzene. | ....do.... | Do. |
| 105 | 1-amino-4-(4'-methylphenoxycarbonyl)-benzene. | ....do.... | Do. |
| 106 | 1-amino-4-isopropoxy-carbonylbenzene. | ....do.... | Do. |
| 107 | 1-amino-4-n-butoxy-carbonylbenzene. | ....do.... | Do. |

EXAMPLE 108

A fine suspension of 19.7 g. of 4-amino-1,1'-azobenzene in 700 ml. of water and 30 ml. of 36% hydrochloric acid is diazotised in the usual way at 10–15° by pouring in a solution of 6.9 g. of sodium nitrite in 50 ml. of water. The clarified diazonium salt solution is added dropwise at 0–5° to a solution of 16.1 g. of 1-hydroxy-2-methyl-4-β-cyanoethylbenzene in 400 ml. of water and 20 ml. of 30% aqueous sodium hydroxide solution. To complete the coupling, the reaction mixture is stirred for 10 hours at 5–10°. The dyestuff formed, which precipitates, of the formula

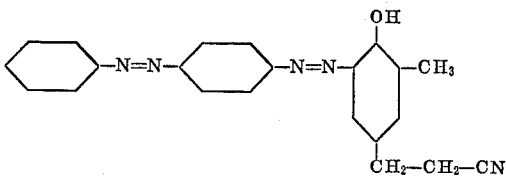

is filtered off, washed with water and dried in vacuo at 60–65°. The dyestuff is a yellow-orange powder. 5 g. of the dyestuff obtained in this way are brought into a finely dispersible form by milling with 12 g. of lignin sulphonate. Polyglycol terephthalate fibres, e.g. "Diolen," are dyed in pure yellow-orange shades with this dye preparation from an aqueous dispersion, optionally in the presence of a carrier such as sodium-o-phenylphenolate. The dyeings are fast to rubbing, sublimation and light.

If the above examples, instead of the 19.7 g. of 4-amino-1,1'-azobenzene, the equimolar amount of one of the diazo components given in column 2 of the following Table IV is used and it is coupled under the conditions given in the above example with one of the coupling components given in column 3, then dyestuffs are obtained which produce dyeings on polyglycol terephthalate fibres having similar good properties. The shades thereof are given in the last column of the table.

TABLE IV

| No. | Diazo component | Coupling component | Shade on polyglycol terephthalate fibres |
|---|---|---|---|
| 109 | 4-amino-2'-chloro-1,1'-azobenzene. | 1-hydroxy-4-β-cyanoethylbenzene. | Yellow-orange. |
| 110 | 4-amino-3'-chloro-1,1'-azobenzene. | ....do.... | Do. |
| 111 | 4-amino-2',4'-dichloro-1,1'-azobenzene. | ....do.... | Do. |
| 112 | 4-amino-4'-methoxy-1,1'-azobenzene. | γ-[1-hydroxyphenyl-(4)]-propionic acid methyl ester. | Do. |
| 113 | 4-amino-3'-nitro-1,1'-azobenzene. | ....do.... | Do. |
| 114 | 4-amino-4'-nitro-1,1'-azobenzene. | ....do.... | Do. |
| 115 | 4-amino-2-methyl-1,1'-azobenzene. | ....do.... | Do. |
| 116 | 4-amino-2,2'-dimethyl-1,1'-azobenzene. | γ-[1-hydroxyphenyl-(4)]-propionic acid ethyl ester. | Do. |
| 117 | 4-amino-4'-methyl sulphonyl-1-1'-azobenzene. | ....do.... | Do. |
| 118 | 4-amino-2-methyl-4'-nitro-1,1'-azobenzene. | ....do.... | Do. |
| 119 | 4-amino-2,5-dimethoxy-4'-nitro-1,1'-azobenzene. | ....do.... | Do. |
| 120 | 4-amino-2-methyl-5-methoxy-4'-nitro-1,1'-azobenzene. | ....do.... | Do. |
| 121 | 4-amino-2,5-dimethyl-4'-nitro-1,1'-azobenzene. | γ-[1-hydroxyphenyl-(4)]-propionic acid amide. | Do. |
| 122 | 4-amino-4'-nitro-2'-chloro-1,1'-azobenzene. | ....do.... | Do. |
| 123 | 4-amino-4'-hydroxy-1,1'-azobenzene. | ....do.... | Do. |
| 124 | ....do.... | γ-[1-hydroxyphenyl-(4)]-propionic acid dimethylamide. | Do. |
| 125 | 4-amino-2'-hydroxy-5'-methyl-1,1'-azobenzene. | γ-[1-hydroxyphenyl-(4)]-propionic acid N-ethyl-N-β-hydroxyethyl-amide. | Do. |
| 126 | 4-amino-2-methyl-5-methoxy-4'-(β-hydroxyethoxy)-1,1'-azobenzene. | γ-[1-hydroxyphenyl-(4)]-propionic acid phenylamide. | Do. |
| 127 | 4-amino-2-methyl-5-methoxy-4'-hydroxy-1,1'-azobenzene. | γ-[1-hydroxyphenyl-(4)]-propionic acid N-methyl-N-phenylamide. | Do. |
| 128 | 4-amino-4'-bromo-1,1'-azobenzene. | 1-hydroxy-4-β-cyanoethylbenzene. | Do. |
| 129 | 4-amino-4'-fluoro-1,1'-azobenzene. | ....do.... | Do. |
| 130 | 4-amino-4'-isobutyl-1,1'-azobenzene. | ....do.... | Do. |

EXAMPLE 131

18 g. of 2-amino-6-methoxy-benzothiazole are dissolved in 100 g. of concentrated sulphuric acid and, at 5°, the solution is diazotised for 3 hours with an amount of nitrosyl sulphuric acid corresponding to 6.9 g. of sodium nitrite. While cooling well, the diazonium salt solution so obtained is added dropwise within 1 hour to a solution of 14.7 g. of 1-hydroxy-4-β-cyanoethylbenzene in 100 ml. of glacial acetic acid. The pH of the reaction solution is buffered to 4–4.5 by the addition of crystalline sodium acetate in portions. The precipitated orange precipiate is filtered off, washed neutral with dilute sodium carbonate solution and finally with water. The dyestuff formed is dried at 60–70°. It is a yellow-brown powder which corresponds to the formula

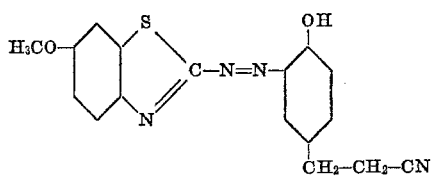

5 g. of the dyestuff so obtained are brought into a finely dispersible form by milling with 15 g. of a lignin sulphonate. Polyglycol terephthalate fibres dyed in clear yellow-brown shades are obtained with this dye preparation from an aqueous dispersion, optionally in the presence of a carrier such as the sodium salt of o-phenylphenol. The dyeings have good fastness to light and sublimation.

Dyestuffs with similar good properties are obtained when the equimolar amount if one of the diazo components listed in column 2 of the following Table V is coupled under the conditions given in the above example with corresponding amounts of one of the coupling components given in column 3. The shades of the dyeings on polygylcol terephthalate fibres attained with the dyestuffs obtained are given in the last column of the table.

TABLE V

| No. | Diazo component | Coupling component | Shade on polyglycol terephthalate fibres |
|---|---|---|---|
| 132 | 2-aminothiazole | 1-hydroxy-4-β-cyanoethylbenzene. | Yellow-brown. |
| 133 | 2-aminobenzothiazole | do | Do. |
| 134 | 5-amino-1,2,4-triazole | do | Do. |
| 135 | 2-amino-1,3,4-thiadiazole. | do | Do. |
| 136 | 3-aminopyridine | do | Do. |
| 137 | 3-aminoindazole | 1-hydroxy-2-methyl-4-β-cyanoethylbenzene. | Do. |
| 138 | 4-aminoquinoline | do | Do. |
| 139 | 1-phenyl-3-methyl-5-aminopyrazole. | do | Do. |
| 140 | 2-amino-5-nitrothiazole | do | Do. |
| 141 | 4-aminobenzotriazole | do | Do. |
| 142 | 2-amino-6-chlorobenzothiazole. | do | Do. |
| 143 | 2-amino-6-methylbenzothiazole. | 1-hydroxy-2-tert.butyl-4-β-cyanoethylbenzene. | Do. |
| 144 | 2-amino-6-acetylaminobenzothiazole. | do | Do. |
| 145 | 2-amino-6-methylsulphonylbenzothiazole. | do | Do. |
| 146 | 1-methyl-3-amino-1,2,4-triazole. | 1-hydroxy-4-β-cyanoethylbenzene. | Yellow. |
| 147 | 2-amino-1,3,4-oxadiazole | do | Do. |
| 148 | 2-amino-6-bromobenzothiazole. | do | Do. |
| 149 | 2-amino-4-methylthiazole. | do | Do. |
| 150 | 2-amino-4-phenylthiazole. | do | Do. |
| 151 | 2-amino-5-chloropyridine. | do | Do. |
| 152 | 1-phenyl-3-carbamoyl-5-aminopyrazole. | do | Do. |
| 153 | 1-(3'-chlorophenyl)-3-methyl-5-aminopyrazole. | do | Do. |
| 154 | 2-amino-4-methylquinoline. | do | Do. |
| 155 | 2-amino-4-chloroquinoline. | do | Do. |
| 156 | 2-amino-4-bromoquinoline. | do | Do. |

EXAMPLE 157

In a pressure dyeing apparatus, 2 g. of the dyestuff obtained according to Example 33 are finely suspended in 2000 ml. of water which contains 4 g. of the condensation product of alcohol and ethylene oxide (molar ratio 1:10). The pH of the dyebath is adjusted to 4–5 with acetic acid.

100 g. of polyethylene glycol terephthalate fabric (e.g. Dacron) are then introduced at 50°, the bath is heated to 130° within 30 minutes and dyeing is performed for 50 minutes at this temperature. The dyeing is then rinsed with water, soaped and dried. Under these conditions, a pure yellow dyeing is obtained which is fast to washing, perspiration, light and sublimation.

The dyestuffs described in the other examples produce dyeings of equal quality by this process.

EXAMPLE 158

2 g. of the dyestuff obtained according to Example 5 are dispersed in 4000 ml. of water. 12 g. of sodium-o-phenylphenolate as carrier and also 12 g. of diammonium phosphate are added to this dispersion and 100 g. of polyglycol terephthalate yarn are dyed for 1½ hours at 95–98°. The dyeing is rinsed and after-treated with dilute sodium hydroxide solution and a dispersing agent.

In this way a pure yellow dyeing is obtained which is fast to washing, light and sublimation.

If in the above example, the 100 g. of polyglycol terephthalate yarn are replaced by 100 g. of cellulose triacetate fabric, dyeing is performed under the conditions given and then the dyeing is rinsed with water, then a yellow dyeing is obtained which has very good fastness to washing and sublimation.

EXAMPLE 159

Polygylcol terephthalate fabric (such as "Dacron," E. I. du Pont de Nemours, Wilmington, Del., USA) is impregnated at 40° in a pad dyeing machine with a liquor of the following composition:

20 parts by weight of the dyestuff obtained according to Example 34, finely dispersed in
5 parts by weight of sodium alginate,
2 parts by weight of sodium 1,5-di-(n-butyl)-naphthalene sulfonate, and
900 parts by weight of water.

The fabric, squeezed out to a content of about 60–70% impregnation liquor, is dried at 100° and then fixed for 30 seconds at a temperature of 210°. The dyed goods are rinsed with water, soaped and dried. Under these conditions, a yellow dyeing is obtained which is fast to washing, rubbing, light and sublimation.

The dyestuffs described in the other examples produce dyeings of equal quality by this process.

I claim:
1. A dyestuff of the formula

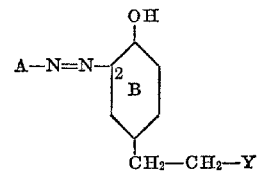

wherein

A represents
(a) phenyl substituted by substituents selected from chlorine, bromine, fluorine, lower alkyl, lower alkoxy, hydroxy-lower alkyl, hydroxy-lower alkoxy, lower alkoxy-lower alkoxy, cyano-lower alkyl, cyano, nitro, trifluoromethyl, cyclohexyl, benzyl, benzyloxy, lower alkyl-benzyloxy, benzoyl, phenoxy, chlorophenoxy, lower alkyl-phenoxy and lower alkoxycarbonyl-lower alkoxy;

(b) phenyl radical substituted in 4-position by an acylamino group, the acyl moiety of said acylamino group is selected from an unsubstituted or substituted lower alkanoyl radical, an unsubstituted or substituted benzoyl radical, an unsubstituted or substituted phenylsulfonyl radical, lower alkylsulfonyl, lower alkenoyl and a grouping

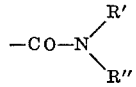

wherein R' represents hydrogen or lower alkyl and R" represents hydrogen lower alkyl, cyclohexyl, benzyl, hydroxy-lower alkyl, lower alkoxy-lower alkyl, lower alkanoyloxy-lower alkyl, phenyl, lower alkyl-phenyl or chloro-phenyl, any substituent of said alkanoyl, benzoyl and phenylsulfonyl radicals being selected from chlorine, lower alkyl and lower alkoxy, and the amino moiety of said acyl amino group is —NH— or -N(lower alkyl)-, and any further substituent of the phenyl radical is chlorine or methoxy;

(c) phenyl substituted by sulfamoyl or carbamoyl, the nitrogen atom of each of which groups bears a first substituent selected from hydrogen and lower alkyl and a second substituent selected from hydrogen, lower alkyl, hydroxy-lower alkyl, lower alkoxy-lower alkyl, phenyl and cyclohexyl;

(d) phenyl substituted by lower alkyl-sulfonyl, phenylsulfonyl, phenoxysulfonyl, chloro-phenoxysulfonyl, lower alkyl-phenoxysulfonyl, phenoxycarbonyl, chloro-phenoxycarbonyl, lower alkyl-phenoxy-carbonyl and lower alkoxycarbonyl; or (e) a heterocyclic diazo component selected from a thiazolyl-(2) radical; a benzothiazolyl-(2) radical; a 1,2,4-triazolyl-(5) radical; 1,3,4-thiadiazolyl-(2); a pyridyl radical; indazolyl-(3); a quinolinyl radical; benzotriazolyl-(4); 1,3,4-oxadiazolyl-(2); and a 1-phenyl-pyrazolyl-(5) radical, any substituent of said heterocyclic diazo component being selected from lower alkyl, nitro, chlorine, lower alkanoylamino, lower alkylsulfonyl, carbamoyl, phenyl and chlorophenyl;

(f) a 4-phenylazo-phenyl radical, which is unsubstituted or ring-substituted by chlorine, nitro, lower alkyl, lower alkoxy, hydroxy-lower alkoxy, lower alkylsulfonyl or hydroxy; and (g) naphthyl substituted by benzoylamino or N-lower alkylsulfamoyl;

Y represents cyano, lower alkoxy-carbonyl or a grouping

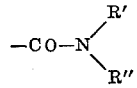

wherein R' and R" have the aforesaid meaning, and wherein the 3-, 5- and 6-positions of ring B are occupied by substituents selected from hydrogen, chlorine, bromine, lower alkyl and lower alkoxy.

2. A dyestuff as defined in claim 1 wherein Y represents cyano.

3. A dyestuff as defined in claim 2 wherein A represents p-benzoylaminophenyl or p-benzoylaminophenyl substituted at the benzoyl moiety by substituents selected from lower alkyl, lower alkoxy and chlorine.

4. A dyestuff as defined in claim 3 wherein the benzene ring B is not further substituted.

5. A dyestuff as defined in claim 1 which is of the formula

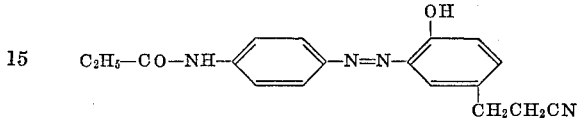

6. A dyestuff as defined in claim 1 which is of the formula

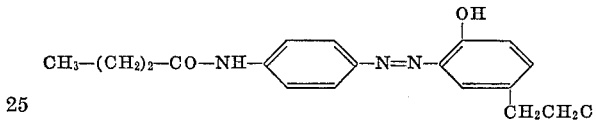

7. A dyestuff as defined in claim 1 which is of the formula

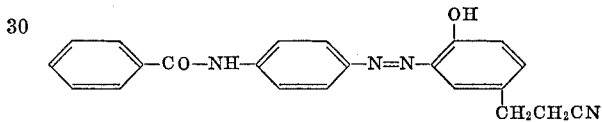

8. A dyestuff as defined in claim 1 which is of the formula

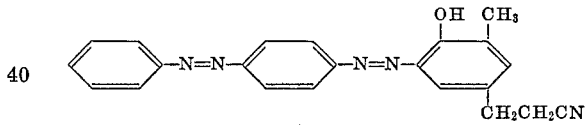

References Cited
UNITED STATES PATENTS

| | | | |
|---|---|---|---|
| 2,773,055 | 12/1956 | Hindermann et al. | 260—163 |
| 2,888,452 | 5/1959 | Schmid et al. | 260—163 |
| 3,169,126 | 2/1965 | Merian et al. | 260—206 |
| 3,208,813 | 9/1965 | Tanaka et al. | 260—206X |
| 3,325,469 | 6/1967 | Berrie et al. | 260—162 |

FLOYD D. HIGEL, Primary Examiner

U.S. Cl. X.R.

8—4, 41, 50; 106—22, 289; 117—138.8, 144; 260—37, 40, 155, 156, 157, 158, 162, 163, 187, 196, 206, 207, 465